United States Patent [19]

Harrison

[11] Patent Number: 5,265,899

[45] Date of Patent: Nov. 30, 1993

[54] ADJUSTABLE OFFSET BALL HITCH

[76] Inventor: Benny Harrison, P.O. Box 1247, Jay, Okla. 74346

[21] Appl. No.: 58,311

[22] Filed: May 10, 1993

[51] Int. Cl.$^5$ .............................................. B60D 1/07
[52] U.S. Cl. ................................ 280/416.1; 280/511; 280/490.1
[58] Field of Search .............. 280/415.1, 416.1, 456.1, 280/490.1, 504, 511

[56] References Cited

U.S. PATENT DOCUMENTS

| | | | |
|---|---|---|---|
| 2,872,213 | 2/1959 | Hosford | 280/416.1 |
| 2,911,233 | 11/1959 | Riddle | 280/416.1 |
| 3,717,362 | 2/1973 | Johnson | 280/416.1 |
| 3,801,134 | 4/1974 | Dees | 280/416.1 |
| 3,922,006 | 11/1975 | Borges | 280/416.1 |
| 4,248,450 | 2/1981 | McWethy | 280/416.1 |
| 4,266,799 | 5/1981 | Wood | 280/490.1 |
| 4,456,279 | 6/1984 | Dirck | 280/416.1 |
| 4,729,571 | 3/1988 | Tienstra | 280/416.1 |
| 5,044,652 | 9/1991 | Brisson | 280/416.1 |
| 5,106,114 | 4/1992 | Haupt | 280/416.1 |
| 5,158,316 | 10/1992 | Hutchmacher | 280/415.1 |

*Primary Examiner*—Margaret A. Focarino
*Assistant Examiner*—Victor E. Johnson
*Attorney, Agent, or Firm*—William S. Dorman

[57] ABSTRACT

An adjustable ball hitch having a shank received in a towing bracket on a towing vehicle, a pair of horizontally spaced vertical support arms connected eccentrically with respect to the shank, a rotatable ball support consisting of a triangular yolk having a triangular opening therethrough and three horizontally extending external surfaces, a radial spoke centrally attached to each of the three surfaces and extending outwardly from the yolk, a ball mounted on the distal end of each spoke, the balls being of three respectively different sizes, first and second pairs of aligned triangular openings provided in the arms, the second pair of aligned triangular openings being vertically offset from the first pair of triangular openings, all of the triangular openings being of the same size, a triangular pin having an outer triangular cross-sectional shape slightly smaller than the triangular openings adapted to be inserted through the first pair of aligned openings and through the opening in the yolk and also adapted to be inserted through the second pair of aligned openings and through the triangular opening in the triangular yolk as an alternate offset position for the triangular yolk.

3 Claims, 2 Drawing Sheets

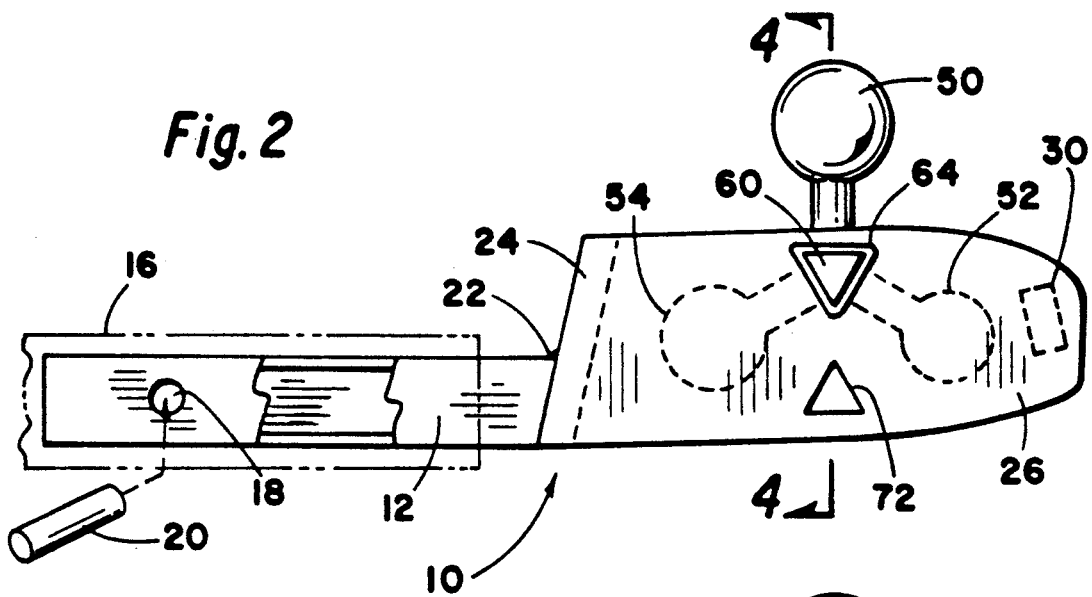
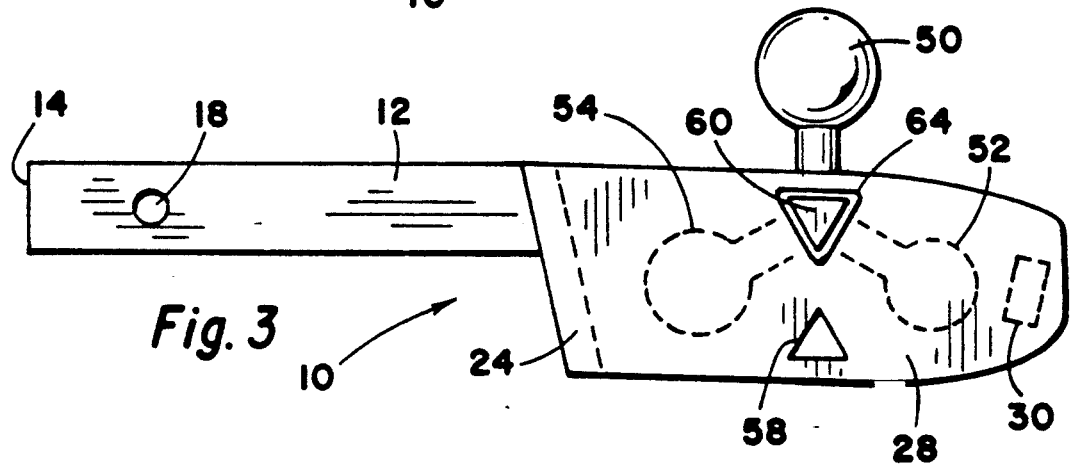
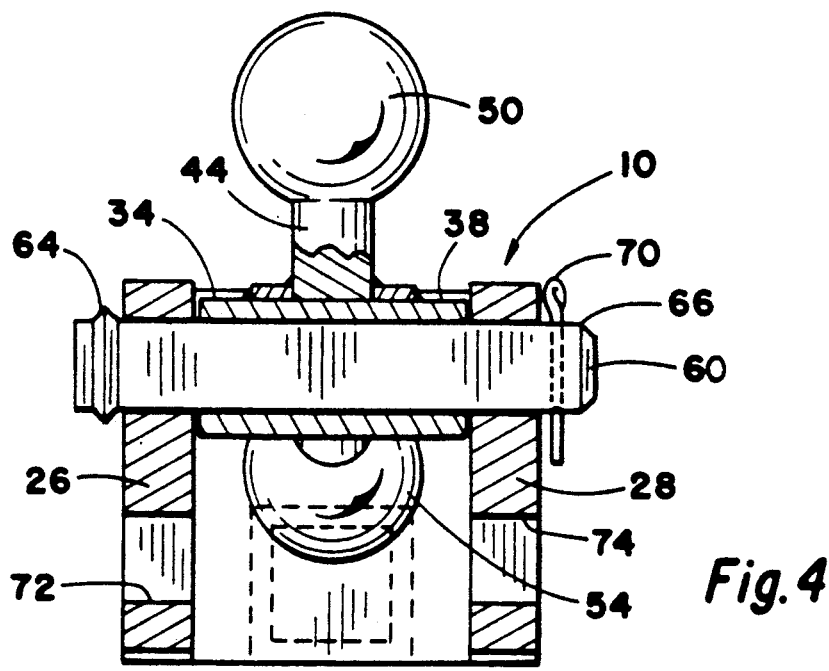

ADJUSTABLE OFFSET BALL HITCH

BACKGROUND OF THE INVENTION

1. Field of the Invention

The present invention relates to a trailer hitch including a plurality of different sized hitch balls enabling selection of a particular size of hitch ball and, in addition, the selection of a different offset position with respect to the ground.

2. The Prior Art

It is generally recognized that the most efficient system for towing a vehicle is through the use of a ball hitch. The diameter of the ball is generally determined by the weight of the vehicle being towed. If a towing vehicle is to be used for towing two or more different sizes of towed vehicles, then the towing vehicle must be equipped with different sized balls.

A preliminary search was conducted and the following parts were uncovered in the search:

| U.S. Pat. No. | Inventor | Issue Date |
| --- | --- | --- |
| 2,872,213 | Hosford | 02/03/59 |
| 2,911,233 | Riddle | 07/11/58 |
| 3,717,362 | Johnson | 02/20/73 |
| 3,801,134 | Dees | 04/02/74 |
| 3,922,006 | Borges | 11/25/75 |
| 4,248,450 | McWethy | 02/03/81 |
| 4,456,279 | Dirck | 06/26/84 |
| 4,729,571 | Tienstra | 03/08/88 |
| 5,044,652 | Brisson | 09/03/91 |
| 5,106,114 | Haupt | 04/21/92 |
| 5,158,316 | Hutchmacher | 10/27/92 |

Although most of the above U.S. patents show plural hitch balls, none show an arrangement whereby the rotatable ball yolk can be adjusted to two vertical offset positions.

SUMMARY OF THE INVENTION

The present invention involves an adjustable ball hitch having a longitudinally extending shank received in a longitudinal opening in a towing bracket on a towing vehicle. A plate is mounted transversely at the rear end of the shank. A pair of horizontally spaced vertical support arms are attached to the transverse plate and a horizontal bracket is connected between the rear ends of the vertical arms. The arms are connected to the plate in such a manner that the arms are eccentric with respect to the shank. A rotatable ball support consists of a triangular yolk having a triangular opening therethrough and three horizontally extending external surfaces forming the triangular shape of the yolk. A radial spoke is centrally attached to each of the three surfaces of the yolk and extends outwardly from the yolk. Each radial spoke is defined as having a proximal end and a distal end, the radial spokes being attached to the three surfaces at their proximal ends.

A ball is mounted on the distal end of each spoke, the balls being of respectively different sizes to accommodate three different sizes of conventional trailer hitches. First and second pairs of aligned triangular openings are provided in the arms, the second pair of aligned triangular openings being vertically offset from the first pair of triangular openings, the four triangular openings in the arms all being of the same size as the triangular opening through the yolk. The length of the triangular yolk is substantially equal to the horizontal distance between the two arms. A triangular pin having first and second ends and having an outer triangular cross-sectional shape slightly smaller than the triangular openings can be inserted through the first pair of aligned openings and through the opening in the yolk. The triangular pin can also be inserted through the second pair of aligned openings and through the triangular opening in the triangular yolk as an alternate offset position for the triangular yolk.

The shank can be locked in the longitudinal opening in the towing bracket by means of aligned openings in the forward end of the shank and in the towing bracket and a pin which passes through these aligned holes.

The triangular pin is provided with an enlargement adjacent to the first end thereof acting as a stop against one of the vertical arms when the pin has been inserted through the arms and through the triangular yolk. The second end of the triangular pin extends through and beyond the other of the vertical arms when the enlargement is adjacent to said one vertical arm. The second end of the triangular pin has a transverse hole therethrough for receiving therein a removable cotter pin to secure the triangular pin in position.

BRIEF DESCRIPTION OF THE DRAWINGS

FIG. 2 is a side view of the trailer hitch shown in FIG. 1 showing the vertical support arms in their upper mode. FIG. 3 is a side view of the trailer hitch shown in FIG. 1 showing the vertical support arms in their lower mode. FIG. 4 is a cross-sectional view taken along section line 4—4 of FIG. 2.

DETAILED DESCRIPTION OF THE PREFERRED EMBODIMENTS

Figure 1:
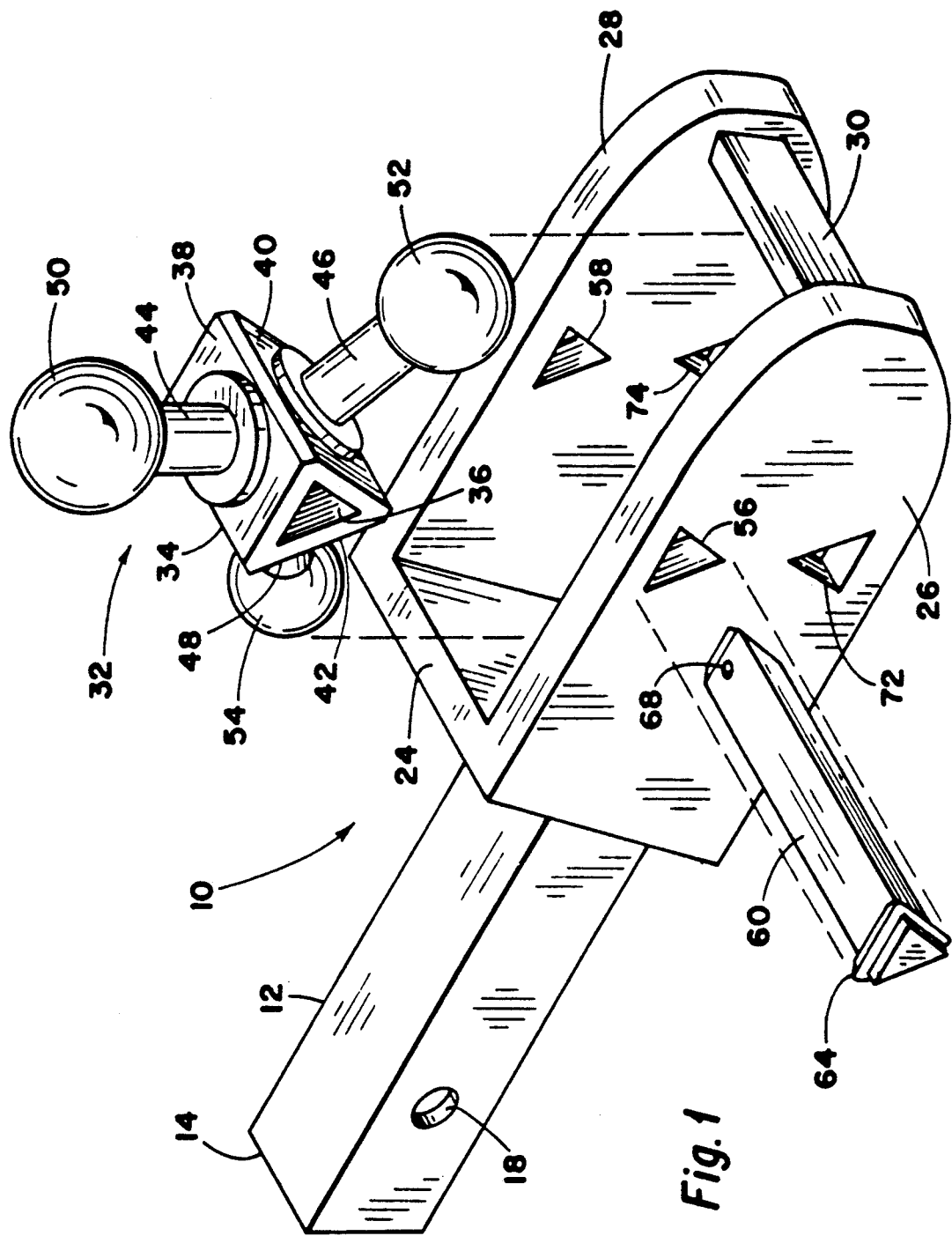
FIG. 1 is a prospective and exploded view of a trailer hitch made in accordance with the present invention.

Referring to the drawings in detail, FIGS. 1 and 2 show an adjustable ball hitch 10 having a longitudinally extending shank 12 which is preferably rectangular in cross-section. The forward end 14 of the shank 12 is adapted to be received in a towing bracket 16 which is mounted on the rear of a towing vehicle (not shown). The shank 12 is provided with a horizontal hole 18 adjacent to the forward end thereof, which mates with a corresponding hole in the bracket 16. A removable pin 20 is adapted to pass through the aligned holes in the bracket and in the shank to hold the ball hitch 10 in position. The forward end 22 of the shank 12 is attached to a transverse plate 24 which is shown to be at a slight angle with respect to the vertical, but which could be at right angles to the shank 12. It should be noted, however, that the shank 12 is attached to the plate 24 along one side edge of the plate so that, in the FIG. 2 position, the remainder of the plate 24 projects above the shank 12. Conversely, as shown in FIG. 3, the remainder of the plate 24 projects downwardly from the shank 12, for a purpose which will hereinafter appear.

A pair of horizontally spaced vertical support arms 26 and 28, the forward ends of the arms 26 and 28 are connected to the plate 24 and a horizontal bracket 30 connects across the rear end of the arms 26 and 28.

Between the arms 26 and 28 there is mounted a rotatable ball support 32 which comprises a triangular yolk 34 having a triangular opening 36 therethrough. The yolk 34 has three horizontally extending surfaces 38, 40 and 42. A radial spoke 44, 46 and 48 is centrally attached to each of the three surfaces 38, 40 and 42, respectively. Each radial spoke has a proximal end which attaches to the horizontally extending external surface of the yolk and a distal end. Balls 50, 52 and 54 are mounted on the distal ends of the spokes 44, 46 and 48, respectively. As will appear from the drawings, the balls are of three different sizes to accommodate three different sizes of conventional trailer hitches (not shown).

The arms 26 and 28 are provided with a first pair of aligned triangular openings 56 and 58 which are the same size as the opening 36 through the yolk 34. As best shown in FIG. 4, the horizontal length of the yolk 34 is equal to the horizontal distance between the arms 26 and 28. A triangular pin 60 is provided. This pin has an outer triangular shape which is slightly smaller than the triangular openings 56, 36 and 58 so as to pass through these openings in the order just mentioned. As best shown in FIG. 4, the pin 60 has a horizontal length which exceeds the maximum horizontal distance across the arms 26 and 28. One end of the triangular pin 60 is provided with and enlargement 64 at its first or left-hand end. When the pin 60 is inserted through the opening 36 in the arm 26 and the opening 58 in the arm 28, the second end 66 will project outwardly beyond the arm 28 as shown in FIG. 4. The second end of the pin 60 is provided with a vertical hole 68 which is adapted to receive a cotter pin 70, as shown in FIG. 4. The arrangement will hold the yolk in position.

The arms 26 and 28 are provided with a second pair of aligned triangular openings 72 and 74 which are disposed below the openings 56 and 58 for a purpose which will hereinafter appear. The openings 72 and 74 are the same size as the openings 56 and 58.

In the position shown in FIG. 2, the ball 50 is higher off the ground than in the FIG. 3 position. If one wishes to utilize the openings 72 and 74, the pin 20 is removed and the shank 12 is slid rearwardly out of the bracket 16. The entire device is then turned 180° and the shank is reinserted in the bracket 16 so that the arms 26 and 28 now project downwardly from the shank 12 as shown in FIG. 3. The triangular pin 60 is removed from the openings 56 and 58 after first removing the cotter pin 70 and the triangular shank 34 is now aligned with the openings 72 and 74 and the pin is reinserted through the second set of aligned openings and the opening 36 in the yolk 34 so as to produce the condition shown in FIG. 3.

If, in either the FIG. 2 or FIG. 3 position, it is desired to use ball 52 or 54 instead of ball 50, the triangular pin is removed, the yolk 34 is rotated one third of a revolution and the pin 60 is reinserted.

Summarizing, a trailer hitch of the present invention provides a ball hitch at two different vertical positions with three different sizes of balls in each of the two positions, making a total of six different ball-height selections.

Whereas, the present invention has been described in particular relation to the drawings attached hereto, other and further modifications, apart from those shown or suggested herein, may be made within the spirit and scope of this invention.

What is claimed is:

1. In combination with a towing vehicle having a longitudinally extending towing bracket mounted at a rear end of the vehicle, the towing bracket having a longitudinal opening therein, an adjustable ball hitch having a longitudinally extending shank having a forward end and a rear end, the forward end of the shank being removably received in the longitudinal opening in the towing bracket, a plate mounted at the rear end of said shank substantially transverse with respect thereto, a pair of horizontally spaced vertical support arms having forward ends and rear ends, the forward ends of said vertical arms being attached to the transverse plate, a horizontal bracket connected between the rear ends of the vertical arms, the arms being connected to the plate in such a manner that the arms are eccentric with respect to the shank, a rotatable ball support comprising a triangular shaped yolk having a triangular opening therethrough and three horizontally extending external surfaces forming the triangular shape of the yolk, a radial spoke centrally attached to each of the three surfaces of the yolk and extending outwardly from the yolk, each radial spoke having a proximal end and a distal end, the radial spokes being attached to the three surfaces at their proximal ends, a ball mounted at the distal end of each spoke, the balls being of respectively different sizes to accommodate three different sizes of conventional trailer hitches, a first pair of aligned triangular openings in the arms, a second pair of aligned triangular openings in the arms vertically offset from the first pair of triangular openings, the four triangular openings in the arms all being of the same size as the triangular opening through the yolk, the triangular yolk having a length substantially equal to the horizontal distance between the two arms, a triangular pin having first and second ends and having an outer triangular cross-sectional shape slightly smaller than the triangular openings through the aligned holes and through the triangular yolk so that the triangular pin can be inserted through the first pair of aligned openings and through the opening in the yolk, and whereby the triangular pin can be inserted through the second pair of aligned openings and through the triangular opening in the triangular yolk as an alternate offset position for the triangular yolk, and locking means for holding the triangular pin in position after it has been inserted through either pair of aligned openings and through the triangular pin in the triangular yolk.

2. The improvement as set forth in claim 1, further comprising means for removably receiving the shank in the longitudinal opening in the towing bracket including aligned openings in the forward end of the shank and in the towing bracket and a pin which will pass through these aligned holes.

3. The improvement as set forth in claim 1 wherein the locking means comprises an enlargement adjacent the first end of the triangular pin acting as a stop against one of the vertical arms when the pin has been inserted through the arms and through the triangular yolk, the second end of the triangular pin extending through and beyond the other of the vertical arms when the enlargement is adjacent to said one vertical arm, the second end of the triangular pin having a transverse hole therethrough for receiving therein a removable cotter pin to secure the triangular pin in position.

* * * * *